United States Patent
Fontana et al.

(10) Patent No.: US 9,830,087 B2
(45) Date of Patent: Nov. 28, 2017

(54) MEMORY WEAR LEVELING

(71) Applicant: Micron Technology, Inc., Boise, ID (US)

(72) Inventors: Marco Giovanni Fontana, Milan (IT); Massimo Montanaro, Cava Manara (IT)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 14/540,968

(22) Filed: Nov. 13, 2014

(65) Prior Publication Data

US 2016/0139826 A1     May 19, 2016

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC .......... *G06F 3/0616* (2013.01); *G06F 3/0644* (2013.01); *G06F 3/0647* (2013.01); *G06F 3/0679* (2013.01)

(58) Field of Classification Search
  CPC .. G06F 12/0246; G06F 3/0679; G06F 3/0604; G06F 11/1068; G06F 3/0616; G06F 3/0644; G06F 3/0647
  USPC ........................................................ 711/103
  See application file for complete search history.

(56) References Cited

U.S. PATENT DOCUMENTS

| | | | | |
|---|---|---|---|---|
| 5,430,859 A | * | 7/1995 | Norman | G06F 3/0613 365/185.33 |
| 5,956,743 A | * | 9/1999 | Bruce | G06F 11/1068 711/103 |
| 6,000,006 A | * | 12/1999 | Bruce | G06F 11/1068 711/103 |
| 6,973,531 B1 | * | 12/2005 | Chang | G06F 12/0246 711/101 |
| 6,985,992 B1 | * | 1/2006 | Chang | G06F 12/0246 365/185.01 |
| 7,096,313 B1 | * | 8/2006 | Chang | G06F 12/0246 711/103 |
| 7,103,732 B1 | * | 9/2006 | Chang | G06F 12/0246 711/103 |
| 7,120,729 B2 | | 10/2006 | Gonzalez et al. | |
| 7,441,067 B2 | | 10/2008 | Gorobets et al. | |
| 8,583,987 B2 | * | 11/2013 | Mirichigni | G06F 11/1044 711/150 |

(Continued)

FOREIGN PATENT DOCUMENTS

WO     2014074449 A2     5/2014

OTHER PUBLICATIONS

Taiwan Office Action & Search Report; TW Application No. 104137602; dated Sep. 29, 2016.

*Primary Examiner* — Sheng-Jen Tsai
(74) *Attorney, Agent, or Firm* — Fletcher Yoder, P.C.

(57) ABSTRACT

Systems and methods for intra-sector re-ordered wear leveling include: detecting, in a memory device, a high wear sub-sector having a high wear level, the sub-sector residing in a first sector; determining a second sector of the memory device having a low wear level; swapping the first sector with the second sector; and re-ordering a position of at least one sub-sector of the first sector, the second sector, or both.

30 Claims, 7 Drawing Sheets

(56) References Cited

U.S. PATENT DOCUMENTS

| | | | | |
|---|---|---|---|---|
| 8,711,625 B2* | 4/2014 | Li | G11C 29/808 | 365/185.09 |
| 8,842,473 B2* | 9/2014 | Tsai | G11C 16/06 | 365/185.09 |
| 9,213,594 B2* | 12/2015 | Strasser | G06F 11/1044 | |
| 2004/0080985 A1* | 4/2004 | Chang | G06F 12/0246 | 365/185.33 |
| 2004/0083335 A1* | 4/2004 | Gonzalez | G06F 12/0246 | 711/103 |
| 2004/0177212 A1* | 9/2004 | Chang | G06F 12/0246 | 711/103 |
| 2005/0091445 A1* | 4/2005 | Chang | G06F 12/0246 | 711/103 |
| 2008/0162798 A1 | 7/2008 | Lofgren et al. | | |
| 2008/0313505 A1 | 12/2008 | Lee et al. | | |
| 2009/0198873 A1* | 8/2009 | Tzeng | G06F 12/0246 | 711/103 |
| 2009/0254689 A1* | 10/2009 | Karamcheti | G06F 12/0246 | 710/301 |
| 2010/0229005 A1* | 9/2010 | Herman | G06F 12/1408 | 713/193 |
| 2011/0302358 A1* | 12/2011 | Yu | G06F 11/108 | 711/103 |
| 2011/0307758 A1* | 12/2011 | Fillingim | G06F 11/1048 | 714/758 |
| 2012/0129301 A1* | 5/2012 | Or-Bach | G11C 8/16 | 438/129 |
| 2012/0278543 A1* | 11/2012 | Yu | G06F 3/0604 | 711/103 |
| 2012/0284587 A1 | 11/2012 | Yu et al. | | |
| 2012/0311237 A1* | 12/2012 | Park | G06F 12/0246 | 711/103 |
| 2012/0331208 A1* | 12/2012 | Chang | G06F 12/0246 | 711/103 |
| 2013/0166827 A1* | 6/2013 | Cideciyan | G06F 12/0246 | 711/103 |
| 2013/0238846 A1 | 9/2013 | Pekny et al. | | |
| 2014/0040681 A1 | 2/2014 | Wolfman et al. | | |
| 2014/0129758 A1* | 5/2014 | Okada | G06F 12/0246 | 711/103 |
| 2014/0189284 A1* | 7/2014 | Hyuseinova | G06F 12/0238 | 711/206 |
| 2014/0192583 A1* | 7/2014 | Rajan | G11C 7/10 | 365/63 |
| 2014/0310569 A1* | 10/2014 | Bloom | G06F 11/1052 | 714/763 |
| 2014/0310574 A1* | 10/2014 | Yu | G06F 11/1072 | 714/773 |
| 2015/0058436 A1* | 2/2015 | Kurita | G06F 15/167 | 709/213 |
| 2015/0067232 A1* | 3/2015 | Fontana | G06F 12/0246 | 711/103 |
| 2015/0067248 A1* | 3/2015 | Yoo | G06F 11/00 | 711/105 |
| 2016/0313929 A1* | 10/2016 | Harrand | G06F 12/0246 | |

* cited by examiner

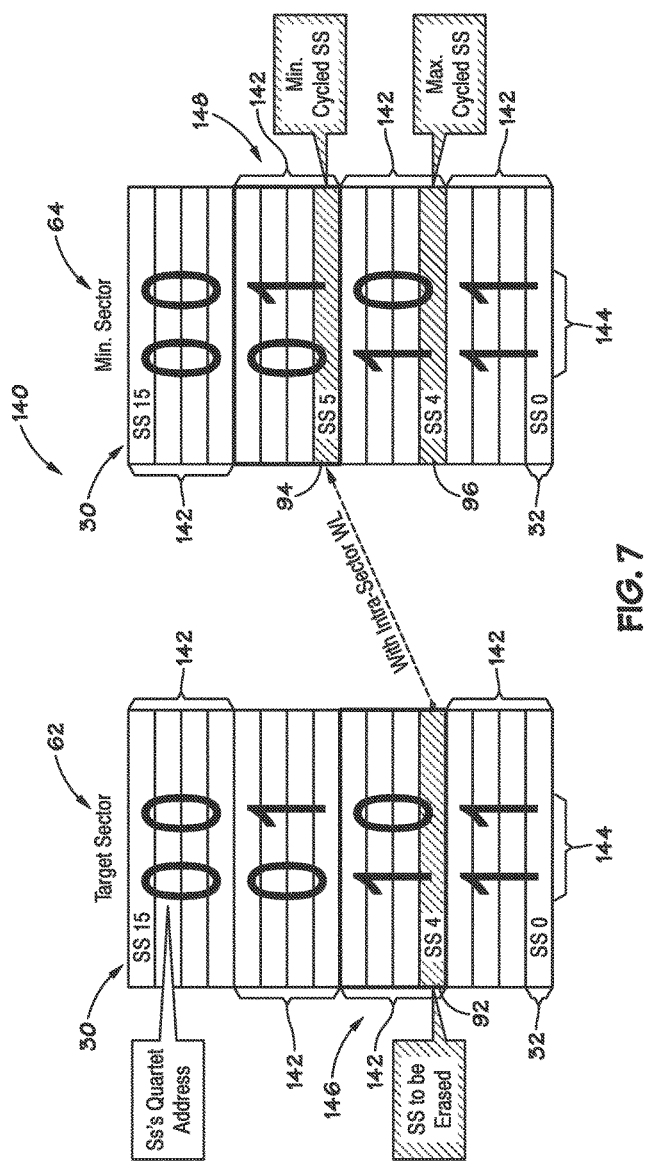

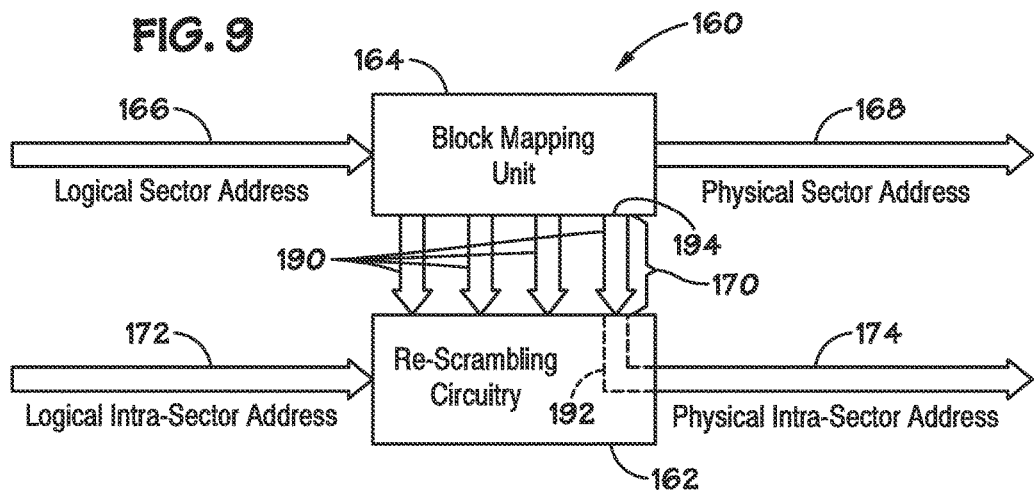
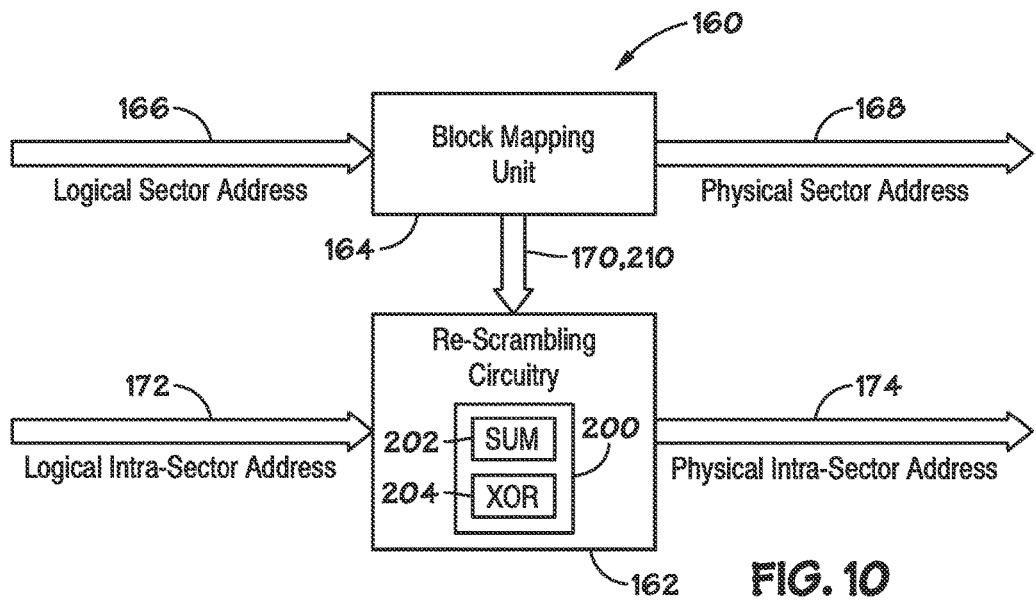

MEMORY WEAR LEVELING

BACKGROUND

1. Field of the Invention

Embodiment of the present invention relate generally to the field of memory devices and more particularly, to systems and methods of wear leveling for memory devices.

2. Description of the Related Art

Computer systems and other electrical systems generally include one or more memory devices. For example, computers often employ NOR flash memory and NAND flash memory. NOR and NAND flash each have certain advantages over the other. For example, NOR flash memory typically has slower write and erase speeds than NAND flash. Further, NAND flash memory typically has more endurance than NOR flash memory. However, NOR flash memory typically enables random access to data stored within the memory devices, whereas, NAND flash memory generally requires accessing and writing data in larger groups. For example, NAND flash memory typically includes a plurality of blocks that each includes a plurality of pages, wherein each page includes a large number of bytes of data. In operation, data is erased one block at a time, and written one page at a time.

Advances in memory technologies have given rise to increased silicon area reduction, while achieving increased storage capacity. Unfortunately, this exponential shrinking of the on-silicon structures has created heavy interference, impacting memory cell cycling endurance. Over time, an aggregation of data operations (e.g., read/write operations) may degrade a memory cell. For example, NAND memory cells have a limited number of write/erase cycles (e.g. 100,000 program/erase cycles).

To prolong the life of these memory devices, "wear leveling" can be applied to spread data across various physical sectors of the memory. Wear leveling generally includes writing data to the various sectors to ensure an even use of the cells to prevent certain portions of the memory array from prematurely failing. Wear leveling may include initially writing the data to one of the various sectors in the memory array, or may include moving the data from one physical sector within the memory array and writing that same data to another physical sectors in the memory array.

Some memory technologies (e.g., page flash memories) feature an additional level of granularity inside each sector called sub-sectors. Sub-sectors are segments of memory inside the sector of a memory. The sub-sectors may be individually accessed (e.g., programmed and/or erased). Accordingly, the sub-sectors have separate cycling, and thus, different wear-out from other sub-sectors within the memory. Unfortunately, traditional wear leveling techniques have not effectively accounted for sub-sector wear, especially in high data cycling application (e.g., page-flash implementations), where the number of cycles may reach into the hundreds of thousands.

BRIEF DESCRIPTION OF THE DRAWINGS

FIG. 7 is a schematic diagram illustrating intra-sector swap, using the process of FIG. 6, in accordance with an embodiment;

FIG. 9 is a schematic drawing illustrating a system having rescrambling circuitry that uses a multiplexer (MUX), in accordance with an embodiment; and FIG. 10 is a schematic drawing illustrating a system having rescrambling circuitry that uses a combinational logic, in accordance with an embodiment.

DETAILED DESCRIPTION OF SPECIFIC EMBODIMENTS

Figure 1:
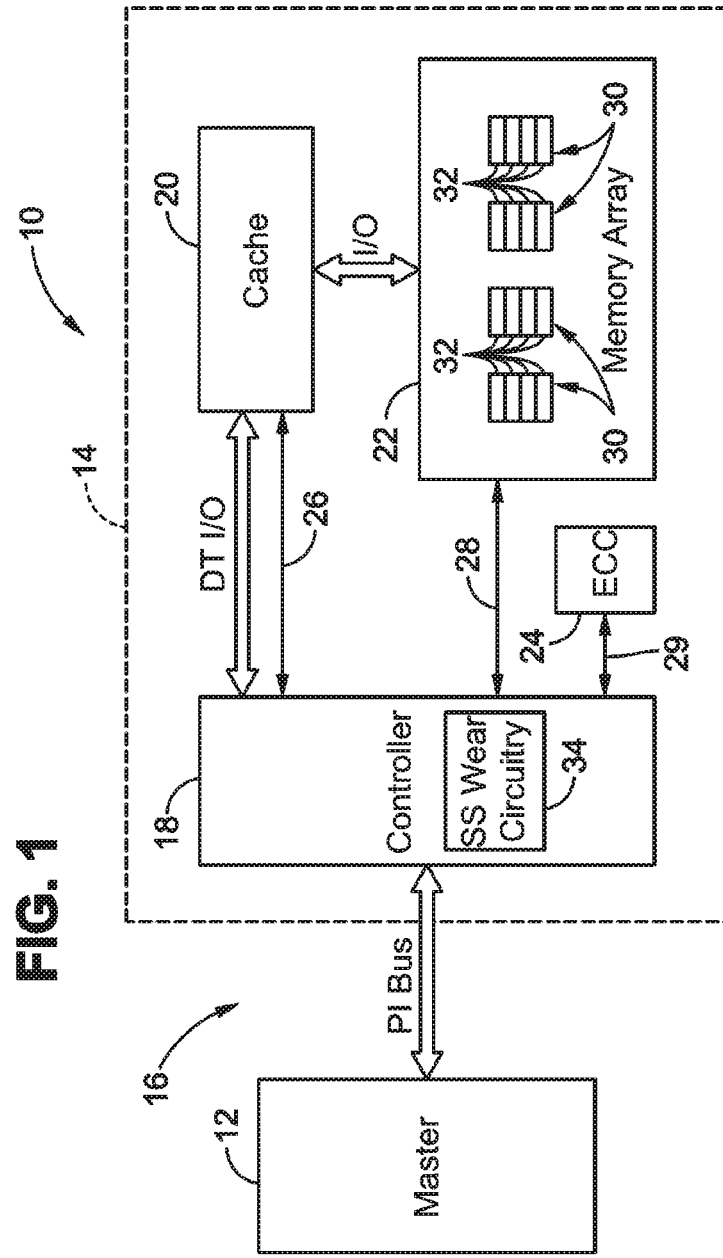
FIG. 1 is a block diagram depicting a memory system having sub-sector wear circuitry that performs an intra-sector swap, in accordance with an embodiment.

FIG. 1 is a block diagram that depicts a memory system, as generally designated by reference numeral 10. The memory system 10 may be any of a variety of types, such as those used in a computer, pager, cellular phone, personal organizer, control circuit, etc. For example, the memory device may be NAND or NOR type flash memory. The system 10 includes a master device 12 and a slave device 14. In one embodiment, the master device 12 may include a microcontroller and the slave device 14 may include a memory device.

The master device 12 communicates with the slave device 14 via various transmission lines. In the illustrated embodiment, the master device 12 and the slave device 14 send and receive signals via a peripheral interface (PI). In the illustrated embodiment, the PI includes a PI bus 16. In some embodiments, the PI bus 16 is a synchronous serial data link standard that operates in full duplex mode. Devices on the PI bus 16 may operate in a master/slave mode that enables the master device 12 to initiate data frames to one or more slave devices 14. The master device 12 and the slave device 14 generally include shift registers that enable them to exchange and store data values. In operation, the master device 12 and the slave device 14 can do various things with the data stored in the registers, such as save the data to memory In the illustrated embodiment, the slave device 14 (e.g., the memory device) includes a controller 18, a cache 20, a memory array 22, and an ECC 24 status register. The controller 18 receives and transmits data via the PI bus 16. Data that is transmitted across the PI bus 16 is received by inputs of the controller 18. The controller 18 also transmits and receives signals via data transfer input/output lines (DT I/O) and control lines 26, 28 and 29 that are internal to the memory device 14. The DT I/O lines enable communication with the cache 20. The control line 26 enables the controller 18 to transmit and receive control signals to and from the cache 20. The control line 28 enables the PI controller to transmit and receive control signals to and from the memory array 22. The control line 29 enables the PI controller to transmit and receive control signals to and from the error-correcting code (ECC) status register 24.

In operation, the controller 18 receives the data transmitted via the PI bus 16, and synchronizes the flow of data (DT I/O) and control signals between other components of the memory 14. For example, the PI controller 18 may receive data and commands in a serialized format via the bus 16, and parse the incoming serialized signal for the data and the commands. The controller 18 may include shift registers that provide appropriate timing of the signals transmitted and received by the controller 18. Further, the controller 18 may include algorithms that are run onboard to interpret incoming signals that include commands, addresses, data, and the like. The algorithms may also include routines to determine the appropriate outputs of the controller 18, including address schemes, error corrections, movements of data within the memory array 22, and the like. As will be discussed in more detail below, in some embodiments, the controller 18 may move stored data to prevent excessive wear caused by data cycling. Similarly, the controller 18 may include circuitry to synchronize the transmission of data from the controller 18 to the master device 12 via the bus 16.

In operation, data (DT I/O) is transferred to or from the memory array 22 byte-by-byte through the cache 20. The cache 20 acts as a data buffer for the data being transferred from the controller 18 to the memory array 22. Data may be written into the cache 20 and subsequently written into the memory array 22. Similarly, data may be read from the memory array 22 into the cache 20, and subsequently transmitted from the cache 20 to the master device 12 via the controller 18 and the bus 16. The cache 20 may be various sizes. For instance, the cache 20 may include 2048 bytes, 4096 bytes, 8192 bytes or a multiple thereof. The cache 20 may also be smaller sizes such as, 256 bytes or 512 bytes. It should be noted, that in certain embodiments, a data register may reside in the cache 20 or the memory array 22 to provide a path for the transfer of data between the cache 20, and the memory array 22. In other words, a plurality of data bits may be shifted into the data register before being written to an address of the memory array 22.

The ECC status register 24 is used to detect and/or correct bit errors that can occur during normal operation, as well as bit errors that occur due to charge loss/gain that develop over time. For example, the ECC status register 24 may include circuitry used to detect and correct errors when reading data back from the memory array 22. The ECC status register 24 may supplement algorithms employed on the controller 18. The ECC status register 24 may also include a group of sub-registers. These sub-registers may include an ECC enable/disable register that enables optional ECC for the memory device data, an ECC type register that stores the total number of errors discovered, an ECC location register that stores the location of any uncorrectable errors, an ECC NAND memory result register that stores information regarding the result of any error correction process on the memory array 22, or an ECC cache memory result register that stores information regarding the result of any error correction process on the cache 20. The ECC status register 24 may include all of the previous ECC sub-registers or any combination of the preceding sub-registers. Although the ECC status register 24 is shown to be external to the controller 18, the ECC status register 24 may be integral to the controller 18.

The memory array 22 includes a memory cell array that is divided into sectors 30. Each sector includes a fixed number of sub-sectors 32. The memory array 22 may include any number and size of sectors 30 and sub-sectors 32. The memory array 22 may be programmed and/or erased at the sector 30 and/or the sub-sector 32 level.

As mentioned above, certain memory cells have a limited number of write/erase cycles (e.g. 100,000 program/erase cycles). To prolong the life of the memory device 14, "wear leveling" can be applied to spread data across various physical locations of the memory. Wear leveling generally includes writing data to the various locations to ensure an even use of the cells to prevent certain portions of the memory array 22 from prematurely failing. Wear leveling may include initially writing the data to one of the various locations in the memory array 22, or may include moving the data from one physical location (e.g., an address) within the memory array 22 and writing that same data to another physical location in the NAND memory array 22. The controller 18 may manage the wear leveling routines used to determine where the data is written to. For example, algorithms, and/or circuitry on the controller 18 may monitor the memory usage and determine an appropriate address to write data within the memory array 22. For example, the controller 18 (or other component of the memory system 10) may include sub-sector wear circuitry 34 that, as will be discussed in more detail below, provides wear leveling based upon the amount of wear of individual sub-sectors 32 within the memory array 22. A block mapping unit (BMU) may be responsible for tracking swap histories as well as re-mapping sectors and/or sub-sectors (e.g., updating addresses of sectors and/or sub-sectors to be re-mapped).

While the sub-sector wear circuitry 34 is illustrated as a part of the controller 18 in embodiment of FIG. 1, the sub-sector wear circuitry 34 may be implemented, in part or in whole, at other components of the memory system 10. For example, in some embodiments, the master device 12 may include a portion of the wear level routines making up the circuitry 34. Further, the slave device 14 may include another portion of the wear level routines making up the circuitry 34.

The sub-sector wear circuitry 34 may be implemented using a number of different approaches. In one embodiment, a hierarchical wear level approach may be implemented. The hierarchical wear level approach may implement sub-sector 32 wear leveling inside each sector 30. In other words, sub-sectors 32 may be swapped inside a sector 30 based upon the relative wear levels of the sub-sectors 32 within the sector 30. A trade-off for a hierarchical wear level approach is that there is increased hardware overhead for such an approach. For example, assignment of individual address remapping hardware may be needed within each sector to achieve this approach.

In another embodiment, sub-sectors may be individually swapped as if they were individual sectors. In essence, this acts to flatten the sub-sector hierarchy, causing an increase in the number of swaps and the swapping pool. A trade-off for this approach is that the increased swapping pool may lead to very complex management of swapping, especially at the sector level.

Figure 2:
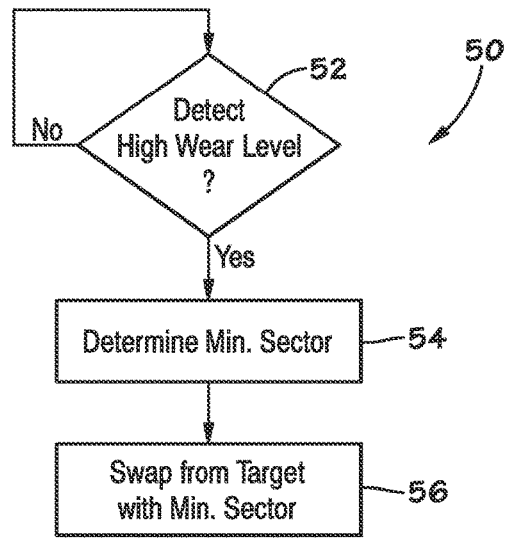
FIG. 2 is a flow diagram illustrating the sector for sub-sector swap process, in accordance with an embodiment.

In a third embodiment, called a sector for sub-sector swap, a sector 30 swap may occur when a sub-sector reaches a threshold wear level. FIG. 2 is a flow diagram illustrating the sector for sub-sector swap process 50, in accordance with an embodiment. The system 10 may detect whether any of the sectors 30 have a high wear level (decision block 52). As mentioned above, the sector wear level may be based upon information about one or more of the sub-sectors 32 within the sector 30. For example, wear may be determined based upon highest cycle count of a sub-sector 32 within the sector 30, a sum of the sub-sector 32 cycle counts for all sub-sectors 32 within a given sector 30, an average of the sub-sector 32 cycle counts for all sub-sectors 32 within a given sector 30, etc. In one embodiment, a high wear level may be found when a pre-determined threshold cycle count is breached (e.g., when a cycle count exceeds 100,000 cycles).

If no sectors 30 are found to have a high wear level, the system 10 continues to monitor for sectors 30 having a high wear level. Once a sector 30 is found to have a high wear level, a swap may be triggered, where the sector 30 having the high wear level is the target sector for swapping to a destination sector 30. Accordingly, this high wear level sector 30 may be referred to as the "Target sector."

The best destination sector 30 may be the sector 30 having the least wear. This sector may be referred to as the "Min Sector." Once a swap is triggered, the Min Sector is determined (block 54). As mentioned above, the wear level may be based upon highest cycle count of a sub-sector 32 within the sector 30, a sum of the sub-sector 32 cycle counts for all sub-sectors 32 within a given sector 30, an average of the sub-sector 32 cycle counts for all sub-sectors 32 within a given sector 30, etc. Accordingly, the Min Sector may be determined by pinpointing the sector having the lowest wear level based upon the cycle counts. Once the Target Sector and the Min Sector are determined, a swap occurs from the Target Sector to the Min Sector (block 56).

For example, the swap may include moving data within the memory array 22 to alternative locations in the memory array 22. This process may generally include loading data from a first address in the memory array 22 into a cache. The cached data may then be written to a new destination location within the array 22.

Figure 3:
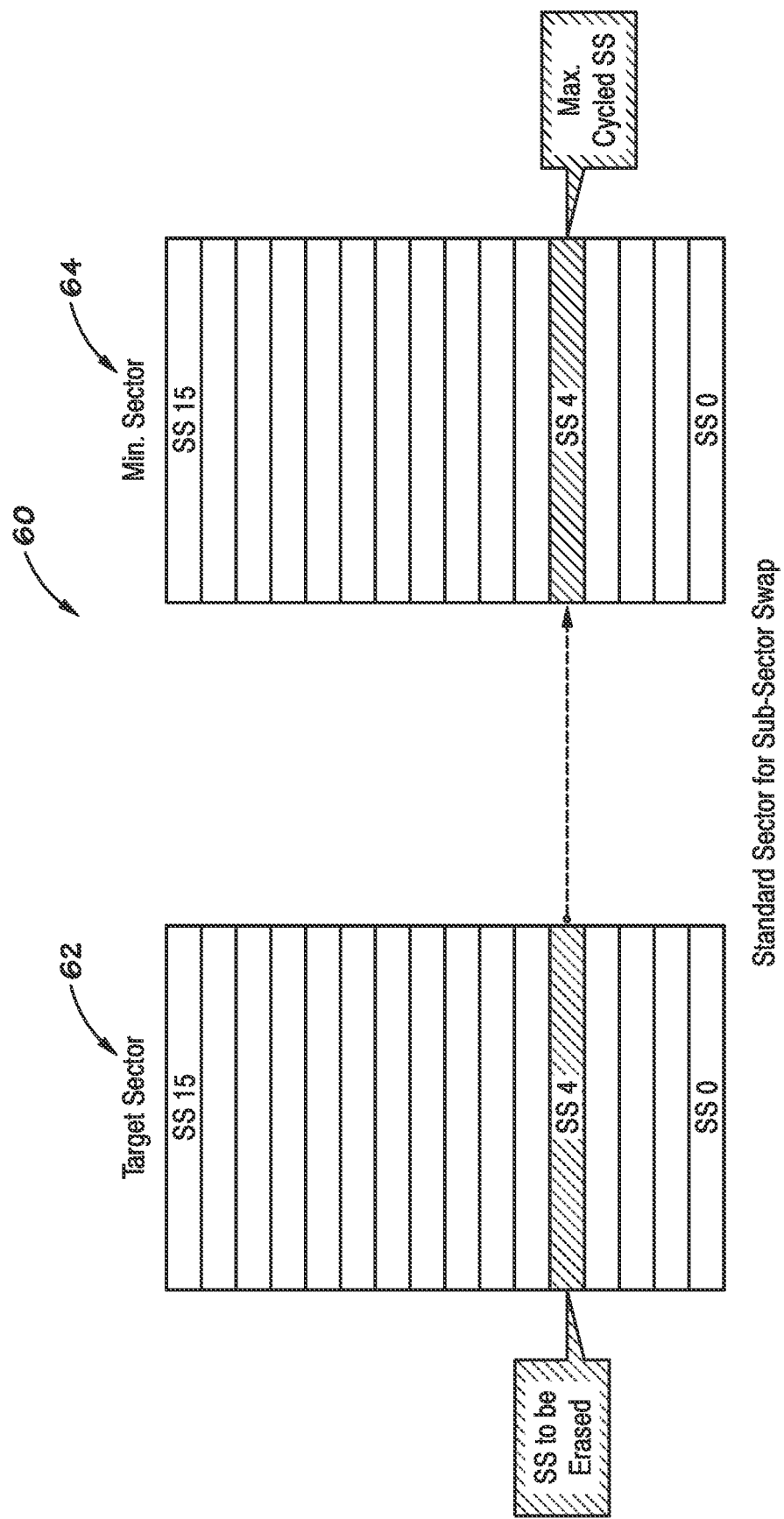
FIG. 3 is a schematic diagram illustrating a sector for sub-sector swap where over-cycling may occur; in accordance with an embodiment.

Under this approach, the swapping level becomes more manageable by broadening the swap to the sector level, while triggering swaps based upon sub-sector wear levels. The transferred sub-sectors 32 in the sector 30 where the worn sub-sector is located retain their sub-sector position in an alternative sector 30 having less wear. One tradeoff for this approach may be over-cycling. For example, when a sector 30 swap is triggered to address wear of one or few sub-sectors 32 within the sector 30, the sector 30 swap may result in the transfer of a sub-sector 32 to a relatively higher-wear sub-sector 32 at the new sector 30 location. Accordingly, these transfers may result in increased wear of the target sub-sectors 32. FIG. 3 is a schematic diagram illustrating a sector for sub-sector swap 60 where over-cycling may occur.

As mentioned above, the sub-sectors 32 for transfer from the target sector 62 to the Min Sector 64 retain their relative positions at the Min Sector 64. Accordingly, sub-sector SS4 of the Target Sector 62 remains SS4 in the Min Sector 64 after transfer. As illustrated, SS4 in the Min Sector 64 may be the relatively-highest wear level sub-sector in the Min Sector 64. Accordingly, this swap may lead to an accumulation of cycles and an over-cycling of the Min Sector 64.

Figure 4:
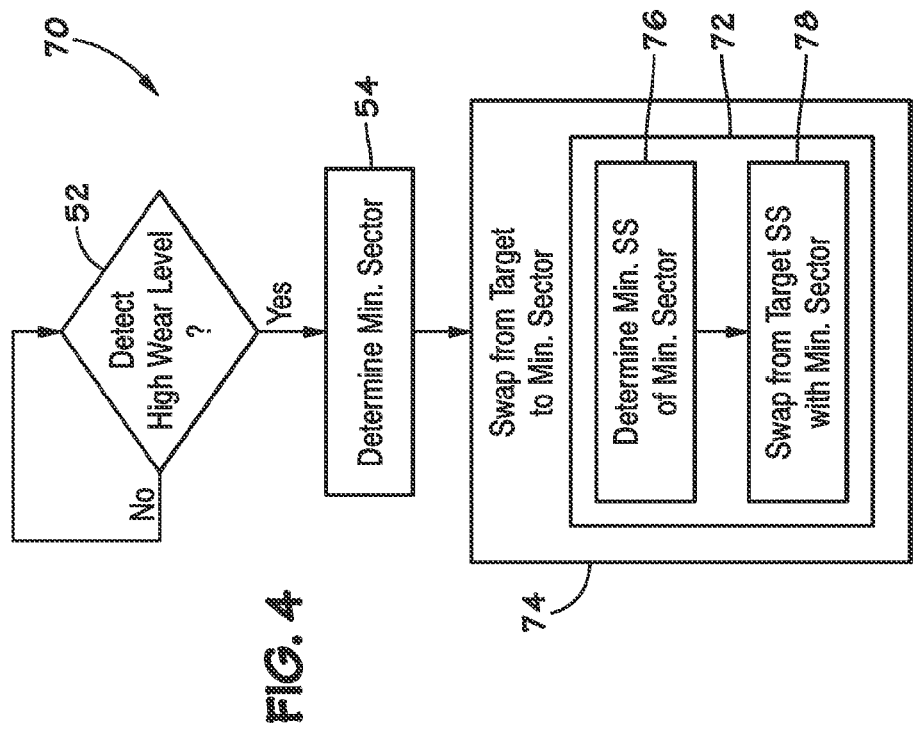
FIG. 4 is a flow-chart illustrating such an intra-sector swap process, in accordance with an embodiment.

To counter-act this issue, in one embodiment, additional logic/circuitry may be implemented to extend the sector for sub-sector swap to reduce sub-sector 32 wear. In particular, the additional logic/circuitry may embed an intra-sector swap of a sub-sector 32 whenever a sector 30 swap is triggered in the sector for sub-sector swap process 50 of FIG. 2. FIG. 4 is a flow-chart illustrating such an intra-sector swap process 70.

As in FIG. 2, the system 10 may detect whether any of the sectors 30 have a high wear level (decision block 52). Further, the sector wear level may be based upon information about one or more of the sub-sectors 32 within the sector 30, such as the highest cycle count of a sub-sector 32 within the sector 30, a sum of the sub-sector 32 cycle counts for all sub-sectors 32 within a given sector 30, an average of the sub-sector 32 cycle counts for all sub-sectors 32 within a given sector 30, etc. As mentioned above, a high wear level may be found when a pre-determined threshold cycle count is breached (e.g., when a cycle count exceeds 100,000 cycles).

If no sectors 30 are found to have a high wear level, the system 10 continues to monitor for sectors 30 having a high wear level. Once a sector 30 is found to have a high wear level, a swap may be triggered from the Target Sector 62 to the Min Sector 64. Once a swap is triggered, the Min Sector 64 is determined (block 54). As mentioned above, the Min Sector 64 may be determined by pinpointing the sector having the lowest wear level based upon sub-sector cycle counts.

Once the Target Sector 62 and the Min Sector 64 are determined, a swap with an embedded sub-sector swap process 72 occurs (block 74). The embedded sub-sector swap process 72 includes determining the Min Sub-Sector (the sub-sector having the lowest wear level) of the Min Sector 64 (block 76). The Target sub-sector (e.g., the sub-sector having the high wear in the target sector 62) is then swapped with the Min Sub-Sector (block 78).

Figure 5:
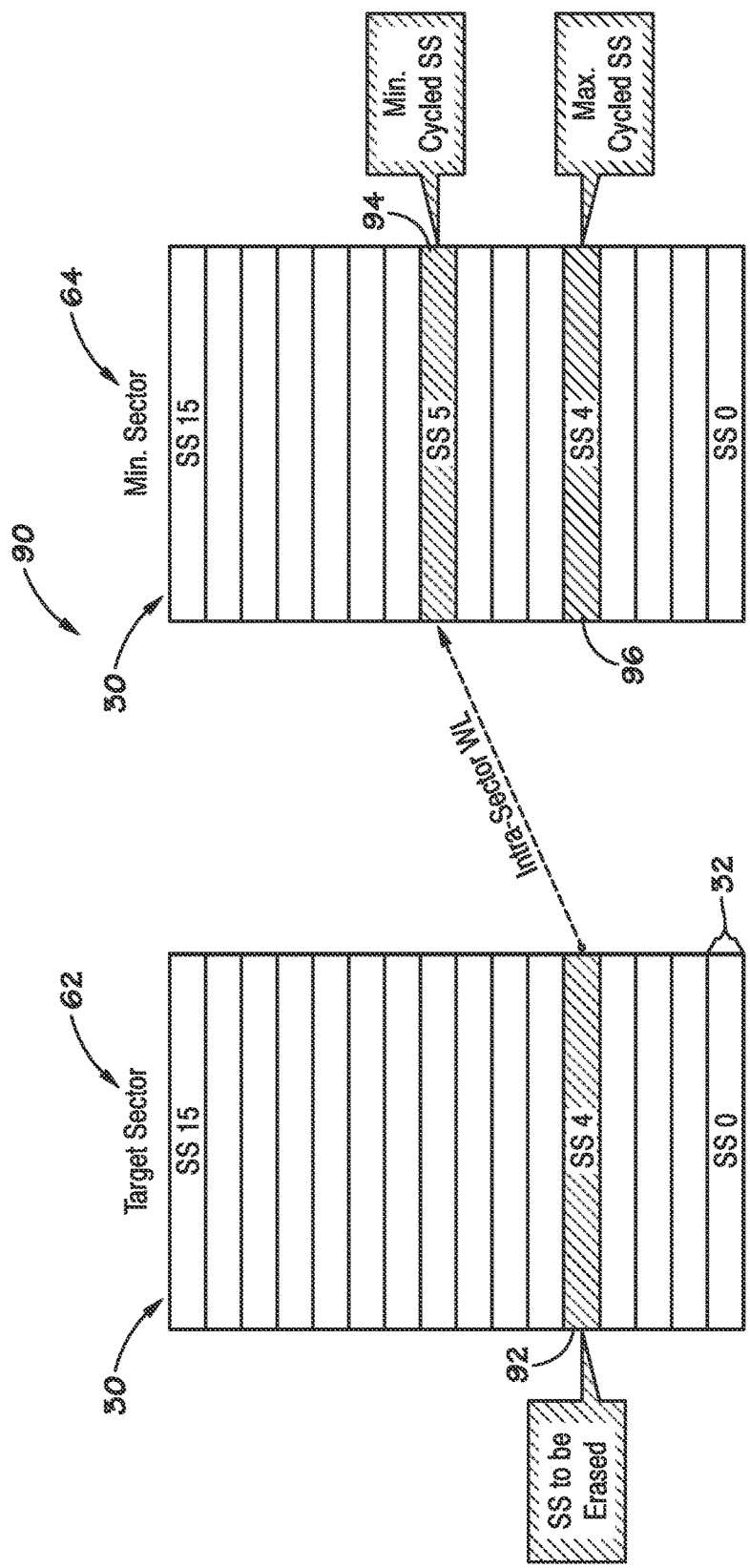
FIG. 5 is a schematic diagram illustrating intra-sector swap using the process of FIG. 4, in accordance with an embodiment.

At the end of the process 70, similar to the sector for sub-sector swap, the Min Sector 64 contains all data of the Target Sector 62. However, the Target sub-sector and the Min Sub-Sector have swapped positions. FIG. 5 is a schematic diagram illustrating intra-sector swap 90, in accordance with the process 70 of FIG. 4.

As illustrated in FIG. 5, sub-sector SS4 is the Max Sub-Sector 92 of the target sector 62. In other words, SS4 is the sub-sector to be erased. Using the sub-sector swap embedded in the Target Sector 62 to Min Sector 64 swap, the Max Sub-Sector 92 is swapped with the Min Sub-Sector 94. Accordingly, over-cycling may be reduced, by ensuring that the Max Sub-Sector 92 is not placed in the sub-sector 96 having the relatively highest wear in the Min Sector 64.

As may be appreciated, the intra-sector swap of Max Sub-Sector 92 and the Min Sub-Sector 94 may result in the reduction of cycle accumulation. In the scenario depicted in FIG. 5, for example, each sector 30 includes 16 sub-sectors 32. Accordingly, by implementing the Max Sub-Sector 92 and the Min Sub-Sector 94 swap, the cycle number may be 16 times less than the a process that does not utilize this swap. Further, because the swap is an intra-sector swap, any processing time increase may be negligible.

Despite the vast improvement in cycle counts and minimal timing costs, the process 70 may utilize an increased silicon area. For example, to swap sub-sectors, the block mapping unit (BMU) may need to track each sub-sector's address instead of merely tracking sector addresses.

Figure 6:
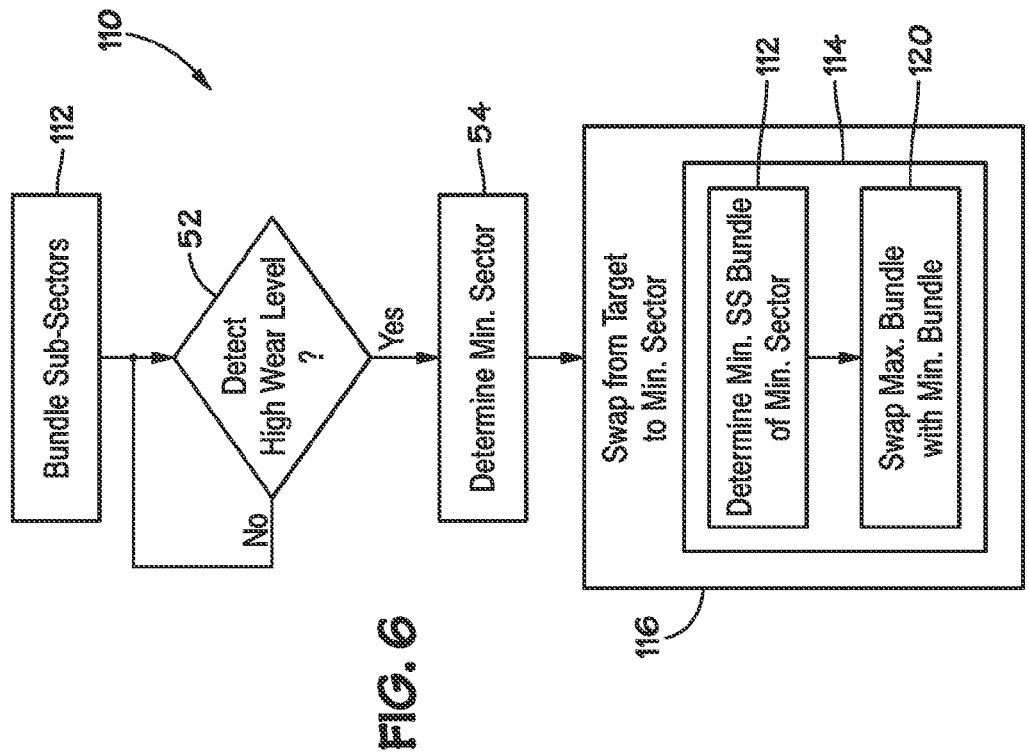
FIG. 6 is a flow diagram illustrating an intermediate intra-sector bundle swap process, in accordance with an embodiment.

Accordingly, an intermediate intra-sector swapping solution may be implemented to reduce the increased silicon area usage. FIG. 6 is a flow diagram illustrating an intermediate intra-sector bundle swap process 110, in accordance with an embodiment.

To mitigate some of the increased silicon area usage needed to track memory addresses of each of the sub-sectors in the intra-sector swap process 70, the sub-sectors may be bundled (block 112), such that a less granular address for a plurality of the sub-sectors may be alternatively used. As will be described in more detail with regard to the discussion of FIG. 7, because the addresses may be less granular, fewer bits of data may be used to define an address of the bundled sub-sectors. Thus, less silicon area may be utilized.

The system 10 may detect whether any of the sectors 30 have a high wear level (decision block 52). As mentioned above, the sector wear level may be based upon information about one or more of the sub-sectors 32 within the sector 30, such as the highest cycle count of a sub-sector 32 within the sector 30, a sum of the sub-sector 32 cycle counts for all sub-sectors 32 within a given sector 30, an average of the sub-sector 32 cycle counts for all sub-sectors 32 within a given sector 30, etc. Further, a high wear level may be found when a pre-determined threshold cycle count is breached (e.g., when a cycle count exceeds 100,000 cycles).

If no sectors 30 are found to have a high wear level, the system 10 continues to monitor for sectors 30 having a high wear level. Once a sector 30 is found to have a high wear level, a swap may be triggered from the Target Sector 62 to the Min Sector 64. Once a swap is triggered, the Min Sector is determined (block 54). As mentioned above, the Min Sector 64 may be determined by pinpointing the sector having the lowest wear level based upon sub-sector cycle counts.

Once the Target Sector 62 and the Min Sector 64 are determined, a swap with an embedded bundled sub-sector swap process 114 occurs (block 116). The embedded bundled sub-sector swap process 114 includes determining the Min Bundle (the bundle containing the sub-sector having the lowest wear level and/or the bundle having the lowest wear level) of the Min Sector 64 (block 118). The Target Bundle (e.g., the bundle containing the sub-sector having the high wear in the target sector 62) is then swapped with the Min Bundle (block 120).

While the process 110 may provide less mitigation of cycle counts than the process 70, it reduces the number of cycles over a standard sector for sub-sector swap approach. Further, because the swaps involve bundles of sub-sectors rather than individual sub-sectors, the management complexity and silicon area usage may be reduced. For example, the block mapping units may retain and manage swaps on a less-granular level than process 70. Thus, the processing complexity and the silicon area may be reduced, while still mitigating some of the un-necessary cycling that occurs in the sector to sub-sector swap approach that does not include an intra-sector swap.

FIG. 7 is a schematic diagram illustrating intra-sector swap 140, in accordance with the process 110 of FIG. 6. As illustrated in FIG. 7, the sub-sectors 32 are bundled into addressable bundles 142. For example, in the illustrated embodiment where the sectors 30 include 16 sub-sectors 32, the sub-sectors are bundled into quartets of four subsectors 32. Further, as illustrated, each of the bundles is addressable in a less-granular manner than would be possible when addressing each sub-sector 32 individually. For example, because each sector 30 in the illustrated embodiment is divided into quartets of four bundled sub-sectors 32, the bundles may be address using two-bits 144. In contrast, individually addressing each sub-sector 32 may utilize increased silicon area. For example, in the illustrated embodiment of 16 sub-sectors 32, at least 4 bits of data would be used to uniquely identify the sub-sector 32 address.

As indicated, the sub-sector SS4 is the Max sub-sector 92 of the target sector 62. In other words, SS4 is the sub-sector to be erased. Further, the bundle 146 with the address "10" is the Max bundle 146, because it contains the Max sub-sector 92. Using the bundled sub-sector swap embedded in the Target Sector 62 to Min Sector 64 swap, the Max Bundle 146 is swapped with the Min Bundle 148 (the bundle 142 that contains the Min Sub-Sector 94).

Accordingly, over-cycling may be reduced, by ensuring that the Max Bundle 146 is not placed in the bundle containing the sub-sector 96 having the relatively highest wear in the Min Sector 64.

As may be appreciated, the intra-sector bundled sub-sector swap of Max Bundle 146 and the Min Bundle 148 may result in the reduction of cycle accumulation. In the scenario depicted in FIG. 7, for example, each sector 30 includes 4 bundles 142. Accordingly, by implementing the Max Bundle 146 and the Min Bundle 148 swap, the cycle number may be 4 times less than the a process that does not utilize this swap. Additionally, the processing and silicon area utilization may be less than the process 70. Further, as above, because the swap is an intra-sector swap, the processing time increase may be negligible.

Figure 8:
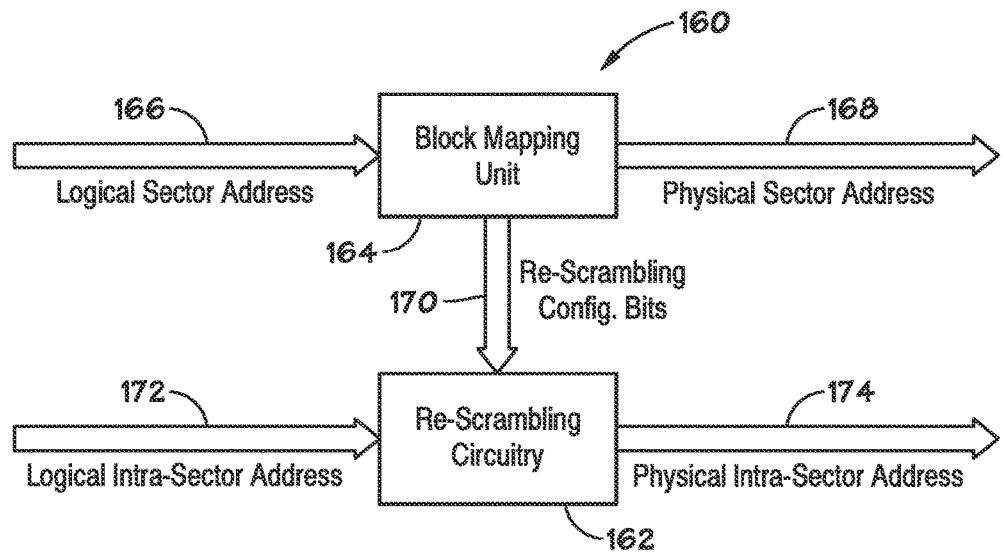
FIG. 8 is a schematic drawing illustrating a system with rescrambling circuitry, in accordance with an embodiment.

In some embodiments, it may be desirable to decrease silicon area usage even more than the area used in the intra-sector bundle swap process 110. One way that this may be achieved is by implementing a global address re-mapping of sub-sectors 32 as a substitute for the intra-sector swaps 72 and/or 114 of FIGS. 4 and 6, respectively. This may be done through rescrambling circuitry that modifies the intra-sector addresses during the sector for sub-sector swap. FIG. 8 is a schematic drawing illustrating a system 160 with rescrambling circuitry 162 that can globally re-map addresses of the sub-sectors, bundles of sub-sectors, etc. to dilute the Max Sub-Sector 92 and/or the Max Bundle 146 from being placed at a sub-sector 32 location in the Min Sector 64 having the highest wear of the Min Sector 64.

As illustrated, the block mapping unit (BMU) 164 receives the logical sector address 166 of a sector 30 where rescrambling is to occur. The BMU 164 may then cause a global address re-mapping by outputting a physical sector address 168 of the sector 30 and one or more configuration bits 170 that cause a particular remapping of a logical intra-sector address 172 to occur. The configuration bits are received at the rescrambling circuitry 162, where a remapped physical intra-sector address 174 is outputted based upon the configuration bits 170 and the logical intra-sector address 172.

In one embodiment, the rescrambling circuitry 162 may include a multiplexer (MUX) solution, as illustrated in FIG. 9. In such an embodiment, the configuration bits 170 may include multiple sets of bits 190, where the sets of bits 190 represent addresses to swap to. For example, in the embodiment of FIG. 7, the sets of bits 190 each represent one of the four quartet bundles. Thus, 4 (the number of items that can be swapped to)×2 (the number of bits needed to represent the address of the swapped to items) are passed to the rescrambling circuitry 162. From there, the multiplexer (e.g., the rescrambling circuitry 162) selects one of the sets of bits 190 for remapping, as indicated by the dashed lines 192. The multiplexer selection is controlled by the logical intra-sector address 172 received as input to the rescrambling circuitry 162. Based on the selected set of bits 190 (e.g., set of bits 194), a remapped physical intra-sector address 174 is outputted.

As may be appreciated, this rescrambling solution may require less silicon area than circuitry that performs an intra-sector swap (e.g., in accordance with the process 70 and/or 110). However, this process may include some additional overhead, because the number of sets of bits 190 may be numerous. Accordingly, in some embodiments, it may be beneficial to use an alternative solution that uses fewer configuration bits 170. FIG. 10 illustrates an embodiment of a system 160 where combinational logic 200 (e.g., Summation logic 202 and/or Exclusive Or (XOR) logic 204) is used in conjunction with a single set 210 of configuration bits 170 and the logical intra-sector address 172 to output a remapped physical intra-sector address 174.

As previously discussed, the block mapping unit (BMU) 164 receives the logical sector address 166 as input. The BMU 164 provides, as output, the physical sector address 168 and a set 210 of configuration bits 170 that may be used in conjunction with the combination logic 200 to remap the logical intra-sector address 172. In this embodiment, the remapping provided by the rescrambling logic may dilute intra-sector cycling by avoiding a high-wear to high-wear placement of sub-sectors. However, unlike the other solutions discussed herein, this solution does not necessarily provide a highest-wear to lowest-wear solution.

To remap, the rescrambling circuitry uses the combination logic 200 between the logical intra-sector address 172 and the set 210 to output the remapped physical intra-sector address. For example, to remap a bundle quartet having the address "01" to a bundle quartet having the address "10" using the summation logic 202, the set 210 of configuration bits 170 provided from the BMU 164 are "01." Alternatively, to achieve the same remap using the XOR logic 204, the set 210 of configuration bits 170 are "11."

Using the intra-sector swap systems and techniques described herein, the time performance of sub-sector wear leveling may be vastly improved. Further, hardware and software logic overhead may be reduced by substituting re-scrambling logic for an intra-sector swap.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A memory device, comprising:
a memory array of sectors having one or more sub-sectors;
a controller configured to receive, transmit, or receive and transmit data via a peripheral interface bus, wherein the controller comprises wear-leveling logic configured to:
detect a high wear sub-sector of the memory device having a high wear level, the sub-sector residing in a first sector;
determine a second sector of the memory device having a low wear level;
swap the first sector with the second sector; and
re-order a position of at least one sub-sector of the first sector, the second sector, or both.

2. The memory device of claim 1, wherein the wear-leveling logic is configured to re-order the position of the at least one sub-sector while swapping the first sector with the second sector.

3. The memory device of claim 1, wherein the wear-leveling logic is configured to:
determine a minimum sub-sector of the second sector having a minimum wear level;
re-order the position of the high wear sub-sector by swapping the position of the high wear sub-sector with a position of the minimum sub-sector.

4. The memory device of claim 1, wherein the wear-leveling logic is configured to:
bundle all sub-sectors of the first sector into a first set of sub-sector bundles;
bundle all sub-sectors of the second sector into a second set of sub-sector bundles; and
swap a position of a first bundle containing the high wear sub-sector with a position of a second bundle containing the minimum sub-sector.

5. The memory device of claim 1, wherein the memory device comprises a NAND type flash memory device.

6. The memory device of claim 1, wherein the memory device comprises a NOR type flash memory device.

7. The memory device of claim 1, comprising:
rescrambling logic configured to modify one or more intra-sector addresses of the memory array; and
a block mapping unit configured to re-map one or more sectors, one or more sub-sectors, or both of the memory-array, wherein the block mapping unit is configured to provide configuration bits to the rescrambling logic to enable the modification of the one or more intra-sector addresses;
wherein the rescrambling logic is used to re-order the position of the at least one sub-sector of the first sector, the second sector, or both.

8. The memory device of claim 7, wherein the rescrambling logic comprises a multiplexer (MUX);
wherein the configuration bits comprise a plurality of sets of bits, each set of bits representing an address modification; and
wherein the MUX is configured to select one of the plurality of sets of bits, the selection resulting in an address modification represented by the selected one of the plurality of sets of bits.

9. The memory device of claim 7, wherein the rescrambling logic comprises combinational logic;
wherein the configuration bits comprise a single set of configuration bits; and
wherein the combinational logic affects a modification to an intra-sector address using the single set of configuration bits.

10. The memory device of claim 9, wherein the combinational logic comprises summation combinational logic.

11. The memory device of claim 9, wherein the combinational logic comprises exclusive or (XOR) combinational logic.

12. A method, comprising:
detecting, in a memory device, a high wear sub-sector having a high wear level, the sub-sector residing in a first sector;
determining a second sector of the memory device having a low wear level;
swapping the first sector with the second sector; and
re-ordering a position of at least one sub-sector of the first sector, the second sector, or both.

13. The method of claim 12, comprising:
determining a minimum sub-sector of the second sector having a minimum wear level; and
re-ordering the position of the high wear sub-sector by swapping the position of the high wear sub-sector with a position of the minimum sub-sector.

14. The method of claim 12, comprising:
bundling all sub-sectors of the first sector into a first set of sub-sector bundles;
bundling all sub-sectors of the second sector into a second set of sub-sector bundles; and
swapping a position of a first bundle containing the high wear sub-sector with a position of a second bundle containing the minimum sub-sector.

15. The method of claim 12, comprising:
   modifying one or more intra-sector addresses of the memory array to re-order the position of the at least one sub-sector of the first sector, the second sector, or both.

16. The method of claim 15, comprising modifying the one or more intra-sector addresses of the memory array using a multiplexer.

17. The method of claim 15, comprising modifying the one or more intra-sector addresses of the memory array using combinational logic comprising summation logic, exclusive or (XOR) logic, or both.

18. A tangible, non-transitory, machine-readable medium, comprising instructions to:
   detect, in a memory device, a high wear sub-sector having a high wear level, the sub-sector residing in a first sector;
   determine a second sector of the memory device having a low wear level;
   swap the first sector with the second sector; and
   re-order a position of at least one sub-sector of the first sector, the second sector, or both, by:
      swapping a position of the high wear sub-sector with a position of a low wear sub-sector in the second sector;
      modifying one or more intra-sector addresses of the first sector, the second sector, or both; or
      both.

19. The machine-readable medium of claim 18, comprising instructions to swap the position of the high wear sub-sector with the position of the low wear sub-sector in the minimum sub-sector by:
   bundling all sub-sectors of the first sector into a first set of sub-sector bundles;
   bundling all sub-sectors of the second sector into a second set of sub-sector bundles; and
   swapping a position of a first bundle containing the high wear sub-sector with a position of a second bundle in the second sector containing the low wear sub-sector.

20. The machine-readable medium of claim 18, comprising instructions to modify the one or more intra-sector addresses of the first sector, the second sector, or both by:
   using a multiplexer to select one or more modifications to the one or more intra-sector addresses;
   using combinational logic to make one or more modifications to the one or more intra-sector addresses; or
   both.

21. A memory controller, comprising:
   circuitry configured to:
      detect a high wear sub-sector of a memory device having a high wear level, the sub-sector residing in a first sector;
      determine a second sector of the memory device having a low wear level;
      swap the first sector with the second sector; and
      re-order a position of at least one sub-sector of the first sector, the second sector, or both.

22. The memory controller of claim 21, wherein the circuitry is configured to re-order the position of the at least one sub-sector while swapping the first sector with the second sector.

23. The memory controller of claim 21, wherein the circuitry is configured to:
   determine a minimum sub-sector of the second sector having a minimum wear level;
   re-order the position of the high wear sub-sector by swapping the position of the high wear sub-sector with a position of the minimum sub-sector.

24. The memory controller of claim 21, wherein the circuitry is configured to:
   bundle all sub-sectors of the first sector into a first set of sub-sector bundles;
   bundle all sub-sectors of the second sector into a second set of sub-sector bundles; and
   swap a position of a first bundle containing the high wear sub-sector with a position of a second bundle containing the minimum sub-sector.

25. The memory controller of claim 21, wherein the circuitry is configured to:
   modify one or more intra-sector addresses of a memory array to re-order the position of the at least one sub-sector of the first sector, the second sector, or both.

26. A memory system, comprising:
   a slave device configured to manage, store, or manage and store data;
   a master device configured to provide data frames to the slave device to facilitate the management, storage, or the management and storage of the data;
   a peripheral interface configured to communicatively couple the master device with the slave device, wherein the data frames are provided from the master device to the slave device via the peripheral interface;
   wear logic configured to:
      detect, in the slave device, a high wear sub-sector having a high wear level, the sub-sector residing in a first sector;
      determine, in the slave device, a second sector having a low wear level;
      swap the first sector with the second sector; and
      re-order a position of at least one sub-sector of the first sector, the second sector, or both.

27. The memory system of claim 26, wherein the wear logic is contained within a controller of the slave device.

28. The memory system of claim 26, wherein the wear logic is contained at least in part in the master device.

29. The memory system of claim 26, wherein the wear logic is configured to:
   bundle all sub-sectors of the first sector into a first set of sub-sector bundles;
   bundle all sub-sectors of the second sector into a second set of sub-sector bundles; and
   swap a position of a first bundle containing the high wear sub-sector with a position of a second bundle containing the minimum sub-sector.

30. The memory system of claim 26, wherein the wear logic is configured to:
   modify one or more intra-sector addresses of a memory array to re-order the position of the at least one sub-sector of the first sector, the second sector, or both.

* * * * *